United States Patent
Li (10) Patent No.: US 10,831,601 B2
(45) Date of Patent: Nov. 10, 2020

(54) RECONSTRUCTION HARD DISK ARRAY AND RECONSTRUCTION METHOD FOR TO-BE-RECONSTRUCTED HARD DISKS THEREIN INCLUDING COMPARING BACKUP DATA WITH AN ACCESS TIMESTAMP OF FIRST, SECOND AND THIRD HARD DISKS

(71) Applicant: INDUSTRIAL TECHNOLOGY RESEARCH INSTITUTE, Hsinchu (TW)

(72) Inventor: Wei-Ru Li, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/529,595

(22) Filed: Aug. 1, 2019

(65) Prior Publication Data

US 2019/0354439 A1    Nov. 21, 2019

Related U.S. Application Data

(63) Continuation of application No. 15/391,272, filed on Dec. 27, 2016, now abandoned.

(30) Foreign Application Priority Data

Dec. 22, 2016   (CN) .......................... 2016 1 1196546

(51) Int. Cl.
*G06F 11/08*     (2006.01)
*G06F 11/10*     (2006.01)
*G06F 11/20*     (2006.01)

(52) U.S. Cl.
CPC ...... *G06F 11/1088* (2013.01); *G06F 11/2058* (2013.01); *G06F 11/2084* (2013.01); *G06F 2201/835* (2013.01)

(58) Field of Classification Search
CPC ............. G06F 11/1076; G06F 11/1084; G06F 11/1088; G06F 11/1092; G06F 11/1446;
(Continued)

(56) References Cited

U.S. PATENT DOCUMENTS 6,195,761 B1 * 2/2001 Kedem ............... G06F 11/1076
                                                    711/114
7,028,139 B1 * 4/2006 Kiselev ............... G06F 11/1076
                                                    711/114
(Continued)

FOREIGN PATENT DOCUMENTS

CN         108089991 A        5/2018

OTHER PUBLICATIONS

CN Office Action in Application No. 201611196546.4 dated Jul. 20, 2020.

*Primary Examiner* — Joseph O Schell
(74) *Attorney, Agent, or Firm* — Maschoff Brennan (57) ABSTRACT

A reconstruction method based on a hard disk array comprises determining whether at least one damaged hard disk among a plurality of hard disks of the hard disk array has been replaced by at least one to-be-reconstructed hard disk, and writing a backup data corresponding to the at least one damaged hard disk into the at least one to-be-reconstructed hard disk according to a mapping table and information of the at least one damaged hard disk.

18 Claims, 7 Drawing Sheets

(58) Field of Classification Search
CPC ............. G06F 11/1458; G06F 11/1469; G06F 11/2058; G06F 11/2084; G06F 3/0646; G06F 3/065; G06F 3/0652; G60F 2201/84; G60F 2201/835
See application file for complete search history.

(56) References Cited

U.S. PATENT DOCUMENTS

| | | |
|---|---|---|
| 9,128,973 B1* | 9/2015 | Murugesan ......... G06F 16/2358 |
| 9,558,072 B1* | 1/2017 | Mam ....................... G06F 16/13 |
| 2005/0091556 A1* | 4/2005 | Frolund .............. G06F 11/1076 714/2 |
| 2006/0259812 A1 | 11/2006 | Chen |
| 2010/0199126 A1* | 8/2010 | Noguchi ............. G06F 11/1076 714/6.12 |
| 2011/0106855 A1* | 5/2011 | Resch ................ G06F 11/1469 707/793 |
| 2015/0347224 A1* | 12/2015 | Abe .................... G06F 11/1612 714/6.23 |
| 2016/0117227 A1* | 4/2016 | Hetrick ............... G06F 11/1469 714/19 |
| 2016/0350185 A1 | 12/2016 | Hong et al. |
| 2018/0143886 A1 | 5/2018 | Liu et al. |

* cited by examiner

| a1 | a2 | a3 | b1 | b2 | b3 | c1 | c2 | c3 | d1 | d2 | d3 |

FIG. 4A

| a1 | a2 | a3 | Pa |
|----|----|----|----|
| b1 | b2 | Pb | b3 |
| c1 | Pc | c2 | c3 |
| Pd | d1 | d2 | d3 |

FIG. 4B

| a̶1̶ | a̶2̶ | a3 | b̶1̶ | b̶2̶ | b3 | c̶1̶ | c2 | c3 | d̶1̶ | d2 | d3 |

FIG. 5A

| a̶1̶ | a̶2̶ | a3 | Pa |
|----|----|----|----|
| b̶1̶ | b̶2̶ | Pb | b3 |
| c̶1̶ | P̶c̶ | c2 | c3 |
| P̶d̶ | d̶1̶ | d2 | d3 |

FIG. 5B

|  |  | a3 |  |  | b3 |  | c2 | c3 |  | d2 | d3 |

FIG. 6A

|  |  | a3 | Pa |
|---|---|----|----|
|  |  | Pb | b3 |
|  |  | c2 | c3 |
|  |  | d2 | d3 |

FIG. 6B

| a1 | | a3 | | | b3 | | c2 | c3 | | d2 | d3 |
|---|---|---|---|---|---|---|---|---|---|---|---|

FIG. 7A

| a1 | | a3 | Pa |
|---|---|---|---|
| | | Pb | b3 |
| | | c2 | c3 |
| | | d2 | d3 |

FIG. 7B

| a1 | a2 | a3 | | | b3 | | c2 | c3 | | d2 | d3 |
|---|---|---|---|---|---|---|---|---|---|---|---|

FIG. 8A

| a1 | a2 | a3 | Pa |
|---|---|---|---|
| | | Pb | b3 |
| | | c2 | c3 |
| | | d2 | d3 |

FIG. 8B

| a1 | a2 | a3 | | | b3 | c1 | c2 | c3 | | d2 | d3 |
|---|---|---|---|---|---|---|---|---|---|---|---|

FIG. 9A

| a1 | a2 | a3 | Pa |
|---|---|---|---|
| | | Pb | b3 |
| c1 | | c2 | c3 |
| | | d2 | d3 |

FIG. 9B

| a1 | a2 | a3 |  |  | b3 | c1 | c2 | c3 |  | d2 | d3 |

FIG. 10A

| a1 | a2 | a3 | Pa |
|----|----|----|----|
|    |    | Pb | b3 |
| c1 | Pc | c2 | c3 |
|    |    | d2 | d3 |

FIG. 10B

| a1 | a2 | a3 | b1' | b2' | b3 | c1 | c2 | c3 |  | d2 | d3 |

FIG. 11A

| a1  | a2  | a3 | Pa |
|-----|-----|----|----|
| b1' | b2' | Pb | b3 |
| c1  | Pc  | c2 | c3 |
|     |     | d2 | d3 |

FIG. 11B

| a1 | a2 | a3 | b1' | b2' | b3 | c1 | c2 | c3 |  | d2 | d3 |

FIG. 12A

| a1  | a2  | a3  | Pa |
|-----|-----|-----|----|
| b1' | b2' | Pb' | b3 |
| c1  | Pc  | c2  | c3 |
|     |     | d2  | d3 |

| a1 | a2 | a3 | b1 | b2 | b3 | c1 | c2 | c3 | d1 | d2 | d3 |

FIG. 14A

| a1 | a2 | a3 | Pa | Qa |
|----|----|----|----|----|
| b1 | b2 | Pb | Qb | b3 |
| c1 | Pc | Qc | c2 | c3 |
| Pd | Qd | d1 | d2 | d3 |

FIG. 14B

| ~~a1~~ | ~~a2~~ | ~~a3~~ | ~~b1~~ | ~~b2~~ | b3 | ~~c1~~ | c2 | c3 | ~~d1~~ | d2 | d3 |

FIG. 15A

| ~~a1~~ | ~~a2~~ | ~~a3~~ | Pa | Qa |
|----|----|----|----|----|
| ~~b1~~ | ~~b2~~ | ~~Pb~~ | Qb | b3 |
| ~~c1~~ | ~~Pc~~ | ~~Qc~~ | c2 | c3 |
| ~~Pd~~ | ~~Qd~~ | ~~d1~~ | d2 | d3 |

FIG. 15B

|  |  |  |  |  | b3 |  | c2 | c3 |  | d2 | d3 |

FIG. 16A

|  |  |  | Pa | Qa |
|----|----|----|----|----|
|  |  |  | Qb | b3 |
|  |  |  | c2 | c3 |
|  |  |  | d2 | d3 |

FIG. 16B

| a1 | | | b1 | | b3 | c1 | c2 | c3 | d1 | d2 | d3 |

FIG. 17A

| a1 | | | Pa | Qa |
|---|---|---|---|---|
| b1 | | | Qb | b3 |
| c1 | | | c2 | c3 |
| | | d1 | d2 | d3 |

FIG. 17B

| a1 | | | b1 | | b3 | c1 | c2 | c3 | d1 | d2 | d3 |

FIG. 18A

| a1 | a2 | a3 | Pa | Qa |
|---|---|---|---|---|
| b1 | b2 | Pb | Qb | b3 |
| c1 | Pc | Qc | c2 | c3 |
| Pd | Qd | d1 | d2 | d3 |

RECONSTRUCTION HARD DISK ARRAY AND RECONSTRUCTION METHOD FOR TO-BE-RECONSTRUCTED HARD DISKS THEREIN INCLUDING COMPARING BACKUP DATA WITH AN ACCESS TIMESTAMP OF FIRST, SECOND AND THIRD HARD DISKS

CROSS-REFERENCE TO RELATED APPLICATIONS

This application is a continuation patent application of U.S. application Ser. No. 15/391,272, filed on Dec. 27, 2016, which claims priority to China Application No(s). 201611196546.4, filed on Dec. 22, 2016, which is incorporated by reference herein in its entirety.

TECHNICAL FIELD

The disclosure relates to a hard disk array and a method for reconstructing thereof.

BACKGROUND

In the field of redundant array of independent disks (RAID), multiple hard disks are combined to become a logical block. For operation system, the entire hard disk array would be treated a hard disk with great capacity, which implies augmenting the equivalent disk capacity connected to a channel. The hard disk array can be categorized into many types, and each type has its own theoretical pros and cons. Different types of hard disk array balance between increasing the authenticity of data and increasing the memory to increase read-write efficiency by different measurements.

By different types of hard disk array, certain types of hard disk array may be able to handle the situation when one single hard disk breaks down. However, due to the structure of hard disk array and the allocation of data, the hard disk array fails when multiple hard disks among the hard disks fail. If users have already back their data up and try to restore the hard disk array, at the time when renewing the broken hard disk with a new hard disk, the data in the unspoiled hard disk should be renewed as well. In such progress, lots of time is consumed for re-writing data that is correct originally. The progress, in which plenty of time and energy are taken up, is also inefficient.

SUMMARY

According to an embodiment of the present disclosure, a reconstruction method based on a hard disk array comprises determining whether at least one damaged hard disk among a plurality of hard disks of the hard disk array has been replaced by at least one to-be-reconstructed hard disk, and writing a backup data corresponding to the at least one damaged hard disk into the at least one to-be-reconstructed hard disk according to a mapping table and information of the at least one damaged hard disk.

According to another embodiment of the present disclosure, a hard disk comprises: a first hard disk; a second hard disk; a third hard disk; and a controller which is electrically connected with the first hard disk, the second hard disk and the third hard disk, and configured to determine whether at least one damaged hard disk among the first hard disk, the second hard disk and the third hard disk has been replaced by at least one to-be-reconstructed hard disk, and to write a backup data corresponding to the at least one damaged hard disk into the at least one to-be-reconstructed hard disk according to a mapping table.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
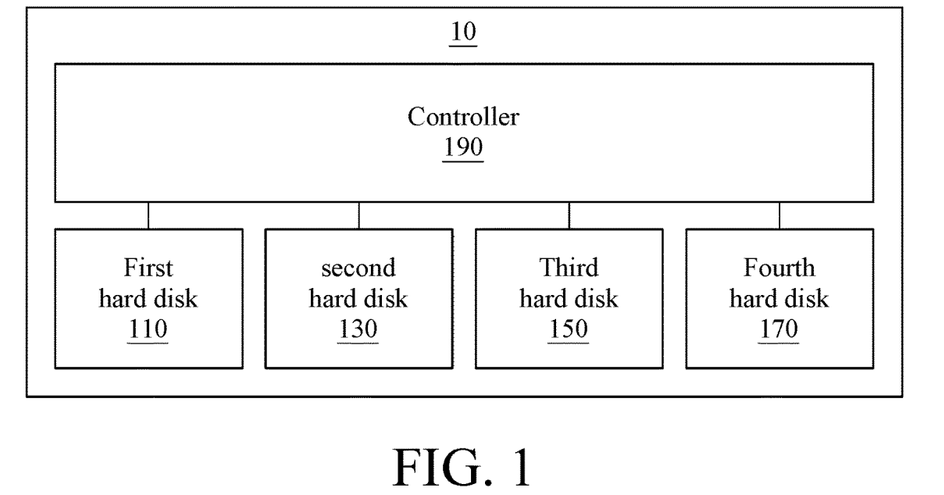
FIG. 1 is a functional block diagram of the hard disk array according to an embodiment of the present disclosure.

FIG. 1 is a functional block diagram of the hard disk array according to an embodiment of the present disclosure. As shown in FIG. 1, the hard disk array 10 comprises a first hard disk 110, a second hard disk 130, the third hard disk 150, a fourth hard disk 170 and a controller 190. The controller 190 is electrically connected with the first hard disk 110, the second hard disk 130, the third hard disk 150 and the fourth hard disk 170. Practically, the number of hard disks the hard disk array 10 have could be N, where N is an integer no less than 3. In the present embodiment, N is 4; however, the number should not be limiting the scope of the present disclosure. The controller 190 may be composed of, among one or more integrated circuit (IC), one or more micro control unit (MCU), one or more application-specific integrated circuit (ASIC), at least one among the group. What should be notice is, the type of hard disk and the form of communication interface are should not be limiting the scope of the present disclosure.

Figure 2:
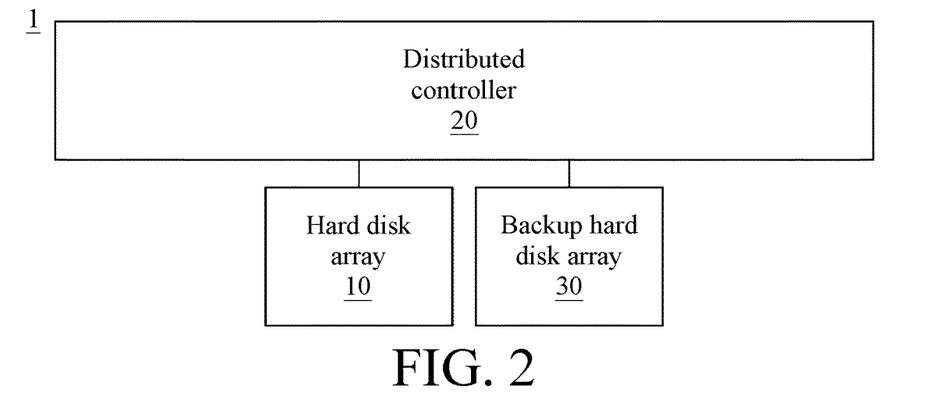
FIG. 2 is a functional block diagram of the distributed storage system according to an embodiment of the present disclosure.

The following would be described with FIG. 2 referred together. FIG. 2 is a functional block diagram of the distributed storage system according to an embodiment of the present disclosure. FIG. 2 depicts a distributed storage system 1. The distributed storage system 1 comprises a hard disk array 10, a backup hard disk array 30 and a distributed controller 20. The distributed controller 20 electrically connects with the hard disk array 10 and the backup hard disk array 30. The distributed controller 20 is configured to control the data transmission of the hard disk array 10 and the backup hard disk array 30. The hard disk array and the backup hard disk array share the same functions, and are a backup for each other. The number for the hard disk array could be more than two. In one embodiment, the distributed controller 20 copies the data, and stores the data respectively in the hard disk array 10 and the backup hard disk array 30.

Figure 3:
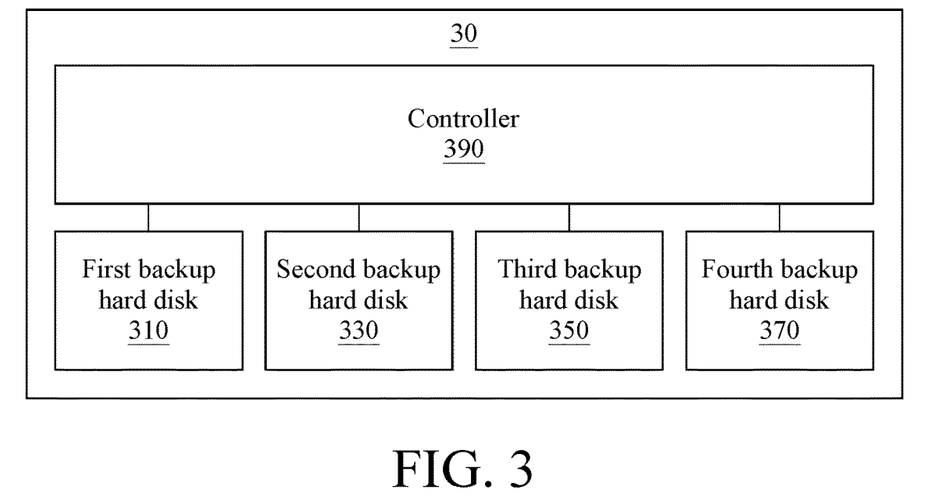
FIG. 3 is a functional block diagram of the backup hard disk array according to an embodiment of the present disclosure.

With FIG. 3 referred together, where FIG. 3 is a functional block diagram of the backup hard disk array according to an embodiment of the present disclosure. As shown in FIG. 3, one of the architectures of the backup hard disk array is shown. In the present embodiment, the backup hard disk array 30 comprises a first backup hard disk 310, a second backup hard disk 330, a third backup hard disk 350, a fourth backup hard disk 370 and a controller 390. The controller 390 electrically connects with the first backup hard disk 310, the second backup hard disk 330, the third backup hard disk 350 and the fourth backup hard disk 370. The backup hard disk array 30 and the hard disk array 10 have a similar architecture. The first backup hard disk 310 is configured to store the backup data of the first hard disk 110, the second backup hard disk 330 is configured to store the backup data of the second hard disk 130, the third backup hard disk 350 is configured to store the backup data of the third hard disk 150 and the fourth backup hard disk 370 is configured to store the backup data of the fourth hard disk 170. The above description is an exemplary; however, the backup data of each hard disk need not to be corresponded one by one to the backup hard disks in real practice. Duplicate data need not to be stored exactly at the same place if an extra comparison is available. The backup hard disk array 30 has N backup hard disks, where N is an integer no less than 3. The present embodiment take N to be 4 as an exemplary, but the number of 4 should not be limiting the scope of the present disclosure.

The controller 190 is configured to monitor the status of the first hard disk 110 of the hard disk array 10, the second hard disk 130 of the hard disk array 10, the third hard disk 150 of the hard disk array 10 and the fourth hard disk 170 of the hard disk array 10. After the controller determines there are at least one to-be-fixed hard disks among the first hard disk 110, the second hard disk 130, the third hard disk 150 and the fourth hard disk 170, the controller 190 may retrieve the backup data from the backup hard disk array 30 by the previously-described architecture. The controller 190 may write into the at least one to-be-fixed hard disks into a data among a backup data and corresponding the at least one to-be-fixed hard disks according to a mapping table. The mapping table may be, such as a corresponding model between the logical block of the hard disk array and the practically physical block. The detail description about the mapping table would be omitted because it may be understood by a person with ordinary skill in the art after referring to the specification of the present disclosure. The following description would delineate the modification of data in the sectors of the first hard disk 110, the second hard disk 130, the third hard disk 150 and the fourth hard disk 170, when the first hard disk 110 and the second hard disk 130 failed.

Figure 4A:
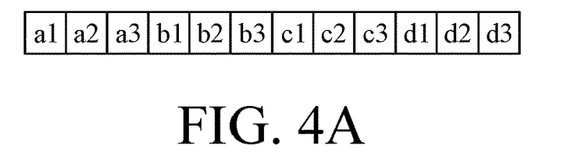
FIG. 4A is a schematic view illustrating the logical block of the hard disk array according to an embodiment of the present disclosure when running normally.
Figure 4B:
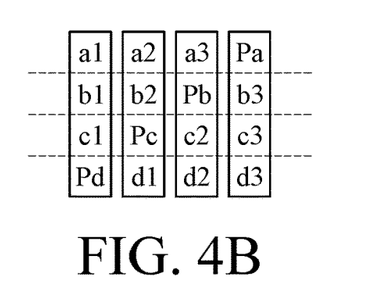
FIG. 4B is a schematic view illustrating the physical block of the hard disk array according to an embodiment of the present disclosure when running normally.

Please refer to FIG. 4A and FIG. 4B, where FIG. 4A is a schematic view illustrating the logical block of the hard disk array according to an embodiment of the present disclosure when running normally, and FIG. 4B is a schematic view illustrating the physical block of the hard disk array according to an embodiment of the present disclosure when running normally. As shown in FIG. 4A, each sector is arranged in order as sector a1, sector a2, sector a3, sector b1, sector b2 . . . to sector d1, sector d2 and sector d3. That is to say, the data that is written into the hard disk would be arranged in the sectors by the above logical sequence. FIG. 4B shows the physical allocation of each of the sectors corresponding to the first hard disk 110, the second hard disk 130, the third hard disk 150 and the fourth hard disk 170. The physical blocks of the first hard disk 110 comprise sectors a1, b1, c1, Pb; the physical blocks of the second hard disk 130 comprise sectors a2, b2, Pc, d1; the physical blocks of the third hard disk 150 comprise sectors a3, Pb, c2, d2; and the physical blocks of the fourth hard disk 170 comprise Pa, b3, c3, d3.

The error correction codes are stored in sectors Pa, Pb, Pc, Pd. The error correction code in sector Pa is generated according to values of sector a1, sector a2 and sector a3; the error correction code in sector Pb is generated according to values of sectors b1, sector b2 and sector b3; the error correction code in sector Pc is generated according to values of sectors c1, sector c2 and sector c3; and the error correction code in sector Pd is generated according to values of sectors d1, sector d2 and sector d3. In one embodiment, the error correction codes are generated by, but not limited to, parity bit.

That is to say, the error correction code in sector Pa is generated according to values of sector a1, sector a2 and sector a3. Logically, when the corresponding data of sector a1, sector a2 and sector a3 are written into the hard disk array 10, it is practically to write the corresponding data of sector a1, sector a2, sector a3 and sector Pa into the first hard disk 110, the second hard disk 130 the third hard disk 150 and the fourth hard disk 170 respectively.

Figure 5A:
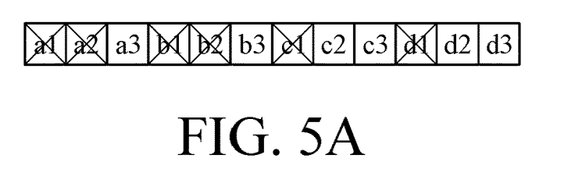
FIG. 5A is a schematic view illustrating the logical block of the hard disk array according to an embodiment of the present disclosure when multiple hard disks break down.
Figure 5B:
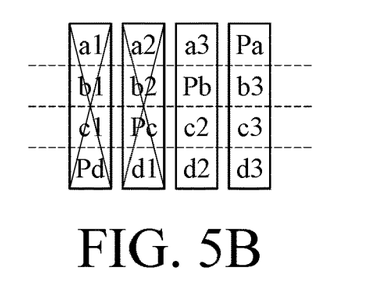
FIG. 5B is a schematic view illustrating the physical block of the hard disk array according to an embodiment of the present disclosure when multiple hard disks break down.
Figure 6A:
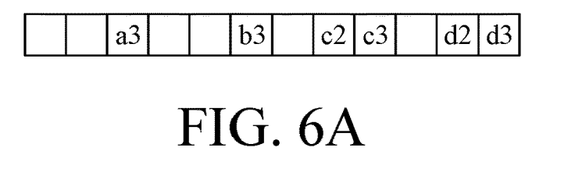
FIG. 6A is a schematic view illustrating the logical block of the hard disk array according to an embodiment of the present disclosure after broken hard disk is replaced.
Figure 6B:
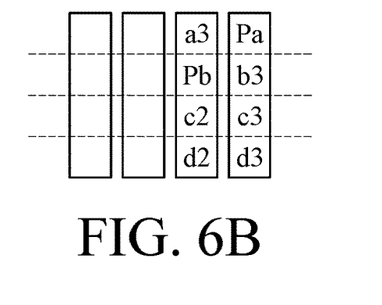
FIG. 6B is a schematic view illustrating the physical block of the hard disk array according to an embodiment of the present disclosure after broken hard disk is replaced.

Please next refer to FIG. 5A, FIG. 5B, FIG. 6A and FIG. 6B. FIG. 5A is a schematic view illustrating the logical block of the hard disk array according to an embodiment of the present disclosure when multiple hard disks break down, FIG. 5B is a schematic view illustrating the physical block of the hard disk array according to an embodiment of the present disclosure when multiple hard disks break down, FIG. 6A is a schematic view illustrating the logical block of the hard disk array according to an embodiment of the present disclosure after broken hard disk is replaced and FIG. 6B is a schematic view illustrating the physical block of the hard disk array according to an embodiment of the present disclosure after broken hard disk is replaced. In the reconstruction method of the embodiment as shown from FIG. 5A to 6B, at least one damaged hard disk is replaced by at least one to-be-reconstructed hard disk which is to be reconstructed to obtain the data similar or identical to the data originally stored in the damaged hard disk. As shown from FIG. 5A to 6B, the first hard disk 110 and the second hard disk 130 are replaced because of damage. Thus, the original sectors a1, b1, c1, Pd, a2, b2, Pc, d1 are replaced by new sectors, so that the new sectors in FIG. 6A and FIG. 6B are not labeled with element number.

Figure 7A:
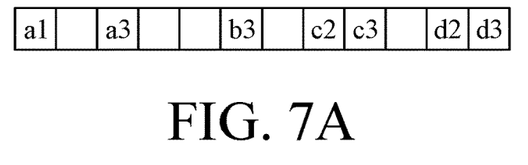
FIG. 7A is a schematic view illustrating the logical block of the hard disk array according to an embodiment of the present disclosure after one of the sectors is reconstructed.
Figure 7B:
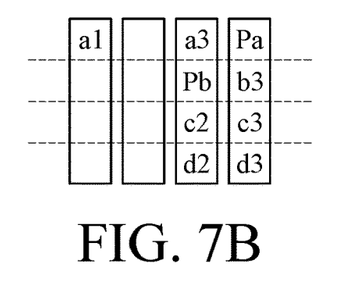
FIG. 7B is a schematic view illustrating the physical block of the hard disk array according to an embodiment of the present disclosure after one of the sectors is reconstructed.

When determining that the damaged hard disks (first and second hard disks 110 and 130) have been replaced by to-be-reconstructed hard disks, the controller 190 writes backup data corresponding to the damaged hard disks into the to-be-reconstructed hard disks according to the mapping table and information of the damaged hard disks. The details of this writing method are described in the following one or more embodiments. Please refer to FIG. 7A and FIG. 7B, where FIG. 7A is a schematic view illustrating the logical block of the hard disk array according to an embodiment of the present disclosure after one of the sectors is reconstructed and FIG. 7B is a schematic view illustrating the physical block of the hard disk array according to an embodiment of the present disclosure after one of the sectors is reconstructed. As shown in the Figs, sector a1 has been reconstructed. In one embodiment, the controller 190 obtains the backup data of sector a1 from the first backup hard disk 310, and writes the backup data into the corresponding sector of the first hard disk 110 according to the mapping table.

Figure 8A:
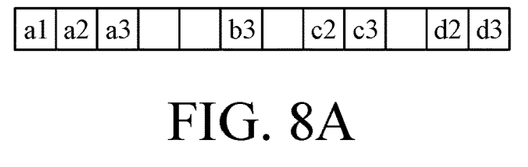
FIG. 8A is a schematic view illustrating the logical block of the hard disk array according to an embodiment of the present disclosure after another one of the sectors is reconstructed.
Figure 8B:
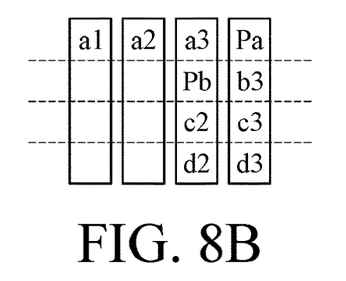
FIG. 8B is a schematic view illustrating the physical block of the hard disk array according to an embodiment of the present disclosure after another one of the sectors is reconstructed.

Please next refer to FIG. 8A and FIG. 8B, where FIG. 8A is a schematic view illustrating the logical block of the hard disk array according to an embodiment of the present disclosure after another one of the sectors is reconstructed and FIG. 8B is a schematic view illustrating the physical block of the hard disk array according to an embodiment of the present disclosure after another one of the sectors is reconstructed. As shown in FIG. 8A and FIG. 8B, after sector a1 is reconstructed, the controller 190 reconstructs sector a1 according to the data of sector a1, the data of sector a3 and the error correction code of Pa.

Figure 9A:
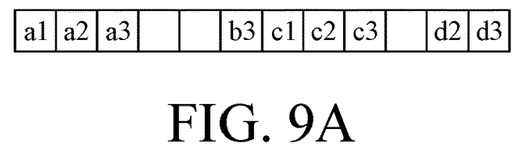
FIG. 9A is a schematic view illustrating the logical block of the hard disk array according to an embodiment of the present disclosure after one another of the sectors is reconstructed.
Figure 9B:
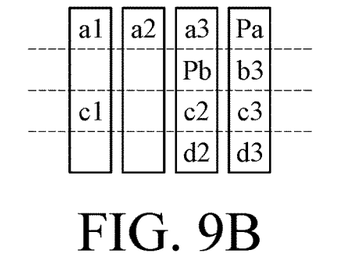
FIG. 9B is a schematic view illustrating the physical block of the hard disk array according to an embodiment of the present disclosure after one another of the sectors is reconstructed.

Please next refer to FIG. 9A and FIG. 9B, where FIG. 9A is a schematic view illustrating the logical block of the hard disk array according to an embodiment of the present disclosure after one another of the sectors is reconstructed and FIG. 9B is a schematic view illustrating the physical block of the hard disk array according to an embodiment of the present disclosure after one another of the sectors is reconstructed. Here, the controller 190 obtains the data of sector c1, and reconstructs sector c1 in the corresponding sector of the first hard disk 110 according to the mapping table.

Figure 10A:
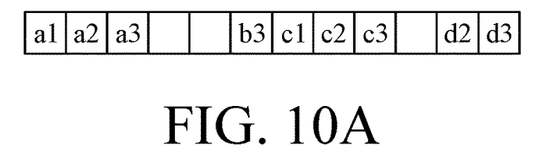
FIG. 10A is a schematic view illustrating the logical block of the hard disk array according to an embodiment of the present disclosure after yet another one of the sectors is reconstructed.
Figure 10B:
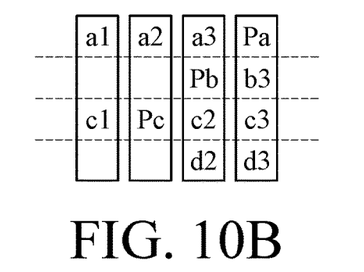
FIG. 10B is a schematic view illustrating the physical block of the hard disk array according to an embodiment of the present disclosure after yet another one of the sectors is reconstructed.

Please next refer to FIG. 10A and FIG. 10B, where FIG. 10A is a schematic view illustrating the logical block of the hard disk array according to an embodiment of the present disclosure after yet another one of the sectors is reconstructed and FIG. 10B is a schematic view illustrating the physical block of the hard disk array according to an embodiment of the present disclosure after yet another one of the sectors is reconstructed. As shown in FIG. 10A and FIG. 10B, at this moment, the first hard disk 110, the third hard disk 150 and the fourth hard disk 170 respectively have sector c1, sector c2 and sector c3. The controller 190 re-calculates and then gives out an error correction code according to the relative data of sector c1, sector c2 and sector c3, and reconstructs sector Pc in the second hard disk 130 according to the error correction code.

In one embodiment, the controller 190 may comprise, such as an access record. The access record associates with a timestamp of the first hard disk 110, the second hard disk 130 and the third hard disk 150. The controller 190, according to the access record, selectively repairs the second hard disk 130 according to the first hard disk 110 and the third hard disk 150. To be more specific, the controller 190 compares the backup data with the access record, to determine whether a data time of the data among the backup data and corresponding to the second hard disk corresponds to the access record. When the data time corresponds to the access record, the controller 190 repairs the second hard disk 130 according to the first hard disk 110 and the second hard disk 130.

In one embodiment, the access record may be, such as at what timings the first hard disk 110, the second hard disk 130 and the third hard disk 150 are written into data, or may be such as at what timings the data stored in the first hard disk 110, the second hard disk 130 and the third hard disk 150 are read. The timestamp may be, such as the timing the first hard disk 110, the second hard disk 130 and the third hard disk 150 are accessed. In other words, the access timing of each data or the access timing of each sector are recorded in the access record. The access record may be, such as stored respectively in the first hard disk 110, the second hard disk 130 and the third hard disk 150, or may be, such as stored in the controller 190, and there is no limitation of where to be stored. In another embodiment, when one of hard disks (the first hard disk 110, the second hard disk 130 and the third hard disk 150) is accessed, the controller 190 generates the corresponding access timestamp according the current timing, and adjusts the access record accordingly. The above description is only for exemplary purpose, the form of the access record and the access timestamp should not be limited.

Figure 11A:
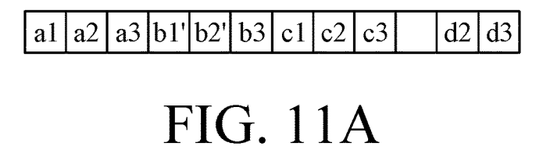
FIG. 11A is a schematic view illustrating the logical block of the hard disk array according to an embodiment of the present disclosure after multiple of the sectors is reconstructed.
Figure 11B:
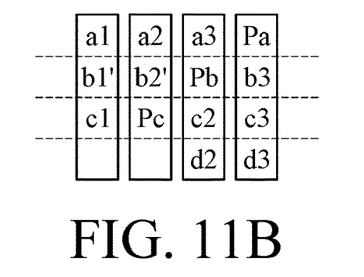
FIG. 11B is a schematic view illustrating the physical block of the hard disk array according to an embodiment of the present disclosure after multiple of the sectors is reconstructed.

Please refer to FIG. 11A and FIG. 11B for the description of reconstructing hard disk according to the access record. FIG. 11A is a schematic view illustrating the logical block of the hard disk array according to an embodiment of the present disclosure after multiple of the sectors is reconstructed and FIG. 11B is a schematic view illustrating the physical block of the hard disk array according to an embodiment of the present disclosure after multiple of the sectors is reconstructed. Here, the controller 190 obtains the data of sector b1' and the data of sector b2' form the backup hard disk array 30. Sector b1' corresponds to the location of sector b1, and sector b2' corresponds to the location of sector b2. However, the controller 190, according to the access record, determines that the data of sector b1' is not the same as the data of sector b1 and the data of sector b2' is not the same as the data of sector b2. Thus, the controller 190 writes into the corresponding location of the first hard disk 110 the data of sector b1' directly according to the mapping table. The controller 190 also writes into the corresponding location of the second hard disk 130 the data of sector b2' directly according to the mapping table.

Figure 12A:
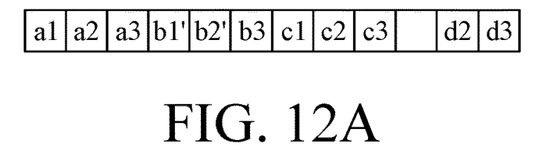
FIG. 12A is a schematic view illustrating the logical block of the hard disk array according to an embodiment of the present disclosure after one after another one of the sectors is reconstructed.
Figure 12B:
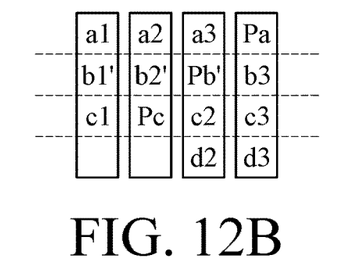
FIG. 12B is a schematic view illustrating the physical block of the hard disk array according to an embodiment of the present disclosure after one after another one of the sectors is reconstructed.

Please next refer to FIG. 12A and FIG. 12B, FIG. 12A is a schematic view illustrating the logical block of the hard disk array according to an embodiment of the present disclosure after one after another one of the sectors is reconstructed and FIG. 12B is a schematic view illustrating the physical block of the hard disk array according to an embodiment of the present disclosure after one after another one of the sectors is reconstructed. After the controller 190 writes the updated sector b1' and sector b2' into the first hard disk 110 and the second hard disk 130, the controller 190 calculates a new error correction code according to sector b1', sector b2' and sector b3', and updates according the new error correction code sector Pb of the third hard disk 150 to form sector Pb'.

The above embodiments may be adapted for RAID 5 architecture. Under RAID 0 architecture, when one hard disk failed, the controller 190 may reconstruct the sector of a broken hard disk according to the mapping table and the corresponding backup hard disk. An embodiment in which RAID 6 architecture is utilized would be given in the following.

Figure 14A:
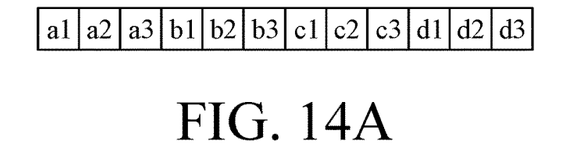
FIG. 14A is a schematic view illustrating the logical block of the hard disk array according to another embodiment of the present disclosure when running normally.
Figure 14B:
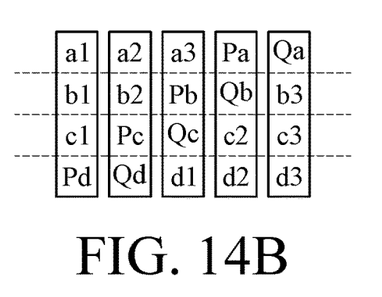
FIG. 14B is a schematic view illustrating the physical block of the hard disk array according to another embodiment of the present disclosure when running normally.

Please refer to FIG. 14A and FIG. 14B. FIG. 14A is a schematic view illustrating the logical block of the hard disk array according to another embodiment of the present disclosure when running normally and FIG. 14B is a schematic view illustrating the physical block of the hard disk array according to another embodiment of the present disclosure when running normally. As shown in FIG. 14A, each sector is arranged in order as sector a1, sector a2, sector a3, sector b1, sector b2 . . . to sector d1, sector d2 and sector d3. That is to say, the data that is written into the hard disk would be arranged in the sectors by the above logical sequence. In the present embodiment, the hard disk array comprises a first hard disk, a second hard disk, a third hard disk, a fourth hard disk and a fifty hard disk. FIG. 14B shows the physical allocation of each of the sectors corresponding to the first hard disk, the second hard disk, the third hard disk, the fourth hard disk and the fourth hard disk. To be more specific, the physical blocks of the first hard disk comprise sectors a1, b1, c1, Pd; the physical blocks of the second hard disk comprise sectors a2, b2, Pc, Qd; the physical blocks of the third hard disk comprise sectors a3, Pb, Qc, d1; the physical blocks of the fourth hard disk comprise Pa, Qb, c2, d2; and the physical blocks of the fifty hard disk comprise Qa, b3, c3, d3. The error correction codes are stored in sectors Pa, Pb, Pc, Pd, Qa, Qb, Qc, Qd. The error correction code in sector Pa is generated according to values of sector a1, sector a2 and sector a3; the error correction code in sector Qa is generated according to values of sector a1, sector a2 and sector a3; the error correction code in sector Pb is generated according to values of sectors b1, sector b2 and sector b3; the error correction code in sector Qb is generated according to values of sectors b1, sector b2 and sector b3; the error correction code in sector Pc is generated according to values of sectors c1, sector c2 and sector c3; the error correction code in sector Qc is generated according to values of sectors c1, sector c2 and sector c3; the error correction code in sector Pd is generated according to values of sectors d1, sector d2 and sector d3; and the error correction code in sector Qd is generated according to values of sectors d1, sector d2 and sector d3. In one embodiment, the error correction code of Pa and the error correction code of Qa are generated by, but not limited to, different types of parity bit; the error correction code of Pb and the error correction code of Qb are generated by, but not limited to, different types of parity bit; the error correction code of Pc and the error correction code of Qc are generated by, but not limited to, different types of parity bit; and the error correction code of Pd and the error correction code of Qd are generated by, but not limited to, different types of parity bit. The detail description of parity bit is omitted for precise purpose.

The error correction codes in sector Pa and sector Qa are generated according to values of sector a1, sector a2 and sector a3. Logically, when the corresponding data of sector a1, sector a2 and sector a3 are written into the hard disk array, it is practically to write the corresponding data of sector a1, sector a2, sector a3, sector Pa and sector Qa into the first hard disk, the second hard disk, the third hard disk, the fourth hard disk and the fifth hard disk.

Figure 15A:
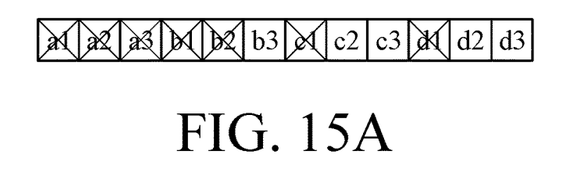
FIG. 15A is a schematic view illustrating the logical block of the hard disk array according to another embodiment of the present disclosure when multiple hard disks break down.
Figure 15B:
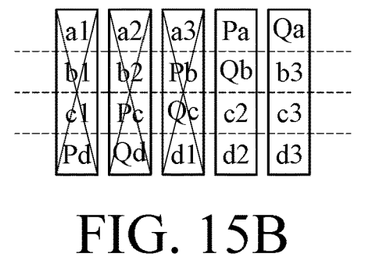
FIG. 15B is a schematic view illustrating the physical block of the hard disk array according to another embodiment of the present disclosure when multiple hard disks break down.
Figure 16A:
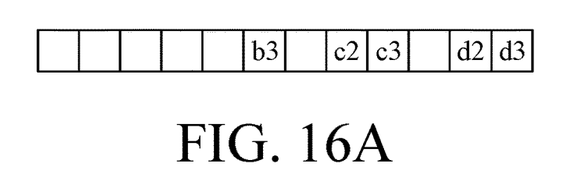
FIG. 16A is a schematic view illustrating the logical block of the hard disk array according to another embodiment of the present disclosure after broken hard disk is replaced.
Figure 16B:
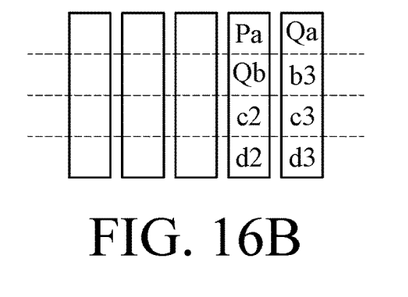
FIG. 16B is a schematic view illustrating the physical block of the hard disk array according to another embodiment of the present disclosure after broken hard disk is replaced.

Please next refer to FIG. 15A, FIG. 15B, FIG. 16A and FIG. 16B. Fig. FIG. 15A is a schematic view illustrating the logical block of the hard disk array according to another embodiment of the present disclosure when multiple hard disks break down, FIG. 15B is a schematic view illustrating the physical block of the hard disk array according to another embodiment of the present disclosure when multiple hard disks break down, FIG. 16A is a schematic view illustrating the logical block of the hard disk array according to another embodiment of the present disclosure after broken hard disk is replaced and FIG. 16B is a schematic view illustrating the physical block of the hard disk array according to another embodiment of the present disclosure after broken hard disk is replaced. In the reconstruction method of the embodiment as shown from FIG. 15A to 16B, at least one damaged hard disk is replaced by at least one hard disk which has to be reconstructed to obtain the data similar or identical to the data originally stored in the damaged hard disk. As shown from FIG. 15A to 16B, the first hard disk, the second hard disk and the third hard disk are replaced because of damage. Thus, the original sectors a1, b1, c1, Pd, a2, b2, Pc, Qd, a3, Pb, Qc, d1 are replaced by new sectors, so that the new sectors in FIG. 16A and FIG. 16B are not labeled with element number.

Figure 17A:
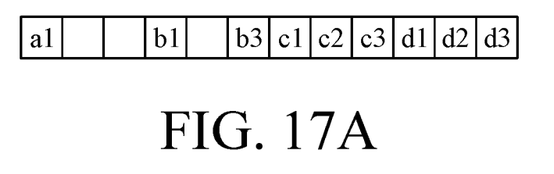
FIG. 17A is a schematic view illustrating the logical block of the hard disk array according to another embodiment of the present disclosure after one of the sectors is reconstructed.
Figure 17B:
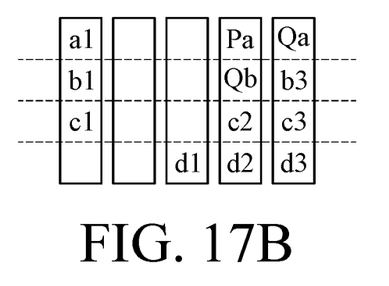
FIG. 17B is a schematic view illustrating the physical block of the hard disk array according to another embodiment of the present disclosure after one of the sectors is reconstructed.

When determining that the damaged hard disks (first, second and third hard disks) have been replaced by to-be-reconstructed hard disks, the controller 190 writes backup data corresponding to the damaged hard disks into the to-be-reconstructed hard disks according to the mapping table and information of the damaged hard disks. The details of this writing method are described in the following one or more embodiments. Please refer to FIG. 17A and FIG. 17B, where FIG. 17A is a schematic view illustrating the logical block of the hard disk array according to another embodiment of the present disclosure after one of the sectors is reconstructed and FIG. 17B is a schematic view illustrating the physical block of the hard disk array according to another embodiment of the present disclosure after one of the sectors is reconstructed. Due to the fact the description here is similar with the previous description, several steps are disclosed briefly in the embodiment shown in FIG. 17A and FIG. 17B. Here, the controller reconstructs sector a1, sector b1, sector c1 and sector d1 according to the backup data and the mapping table. The reconstruction order of reconstructing sector a1, sector b1, sector c1 and sector d1 is not limited.

Figure 18A:
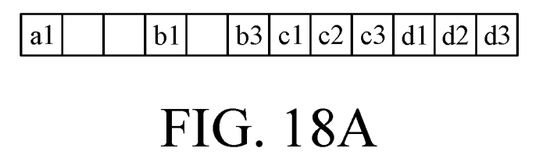
FIG. 18A is a schematic view illustrating the logical block of the hard disk array according to another embodiment of the present disclosure after another one of the sectors is reconstructed.
Figure 18B:
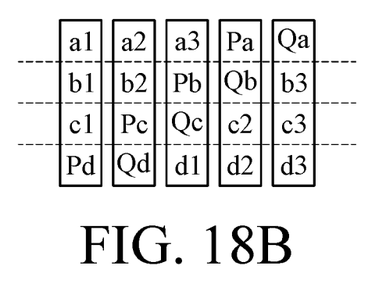
FIG. 18B is a schematic view illustrating the physical block of the hard disk array according to another embodiment of the present disclosure after another one of the sectors is reconstructed.

Please next refer to FIG. 18A and FIG. 18B, where FIG. 18A is a schematic view illustrating the logical block of the hard disk array according to another embodiment of the present disclosure after another one of the sectors is reconstructed and FIG. 18B is a schematic view illustrating the physical block of the hard disk array according to another embodiment of the present disclosure after another one of the sectors is reconstructed. As shown in FIG. 18A and FIG. 18B, after sector a1 is reconstructed, the controller restores the data of sector a2 and the data of sector a3 according to the data of sector a1, the error correction code of Pa and the error correction code of Qa.

After sector b1 is reconstructed, the controller restores the data of sector b2 according to the data of sector b1, the error correction code of sector Qb and the data of sector b3, the controller then reconstructs sector b2 according to the restored data and the mapping table. The controller further re-calculates and then gives out an error correction code according to the data of sector b1, the data of the reconstructed sector b2 and the data of sector b3, and reconstructs sector Pb according to the re-calculated error correction code and the mapping table.

After sector c1 is reconstructed, the controller re-calculates and then gives out an error correction code according to the data of sector c1, the data of sector c2 and the data of sector c3, and reconstructs sector Pc and sector Qc according to the re-calculated error correction code and the mapping table.

After sector d1 is reconstructed, the controller re-calculates and then gives out an error correction code according to the data of sector d1, the data of sector d2 and the data of sector d3, and reconstructs sector Pd and sector Qd according to the re-calculated error correction code and the mapping table.

Figure 13:
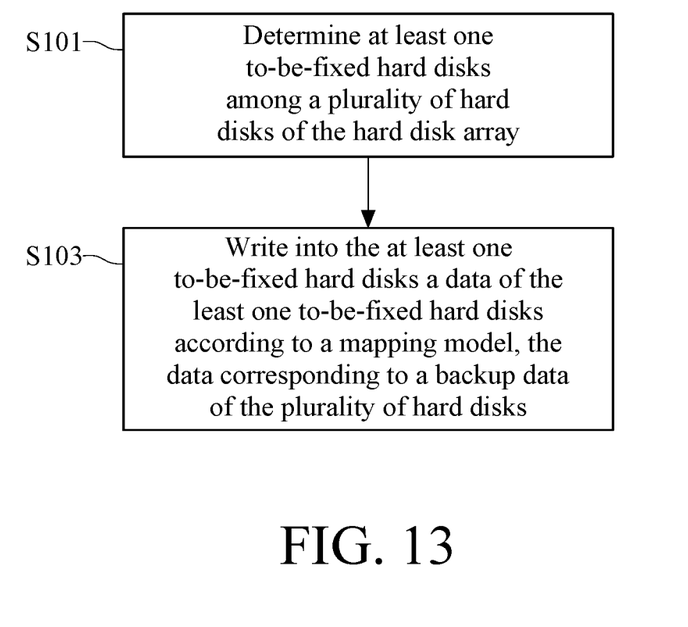
FIG. 13 is a flowchart illustrating the method for reconstructing hard disk array according to an embodiment of the present disclosure.

A method for reconstructing hard disk array is disclosed as well in the present disclosure. The following would be described with the reference of FIG. 13. FIG. 13 is a flowchart illustrating the method for reconstructing hard disk array according to an embodiment of the present disclosure. In step S101, determine at least one to-be-fixed hard disks among a plurality of hard disks of the hard disk array. And in step S103, write into the at least one to-be-fixed hard disks a data of the at least one to-be-fixed hard disks according to a mapping model, the data corresponding to a backup data of the plurality of hard disks.

In one embodiment, the hard disk array is capable of error correcting. The hard disk array comprises a first hard disk, a second hard disk and a third disk, and the at least one to-be-fixed hard disks comprise the first hard disk and the second hard disk. In the step of writing into the at least one to-be-fixed hard disks a data among a backup data and corresponding the at least one to-be-fixed hard disks, the data among the backup data and corresponds to the first hard disk is firstly written into the first hard disk. Moreover, according to the data among the backup data and corresponding to the second hard disk, selectively repairs the second hard disk according to the first hard disk and the third hard disk.

In one embodiment, in the step of according to the access record and the data among the backup data and corresponding to the second hard disk, selectively repairing the second hard disk according to the first hard disk and the third hard disk, the backup data and the access record are compared to determine whether a data time of the data among the backup data and corresponding to the second hard disk corresponds to a timestamp of the access record, and repairing the second hard disk according to the first hard disk and the second hard disk when the data time corresponds to the access record. For example, when the data time is later than the timestamp, that means the backup data is backed up after the last time the second hard disk is accessed, which also means the data among the backup data corresponding to the second hard disk is the latest. Moreover, the data of the second hard disk may be obtained by computing the data of the error correction code of the first hard disk and the third hard disk. Otherwise, it means no latest data of the second hard disk is among the backup data. Under this scenario, the reconstruction of the second hard disk may be completed when the backup data is written into, and the error correction codes of the first hard disk and/or the third hard disk should be modified accordingly.

In one embodiment, in the step of according to the data among the backup data and corresponding to the second hard disk, selectively repairing the second hard disk according to the first hard disk and the third hard disk, the data among the backup data and corresponding to the second hard disk is written into the second hard disk when the data time does not correspond to the access record.

In one embodiment, when the data time does not correspond to the access record, the error correction code stored in the first hard disk, the second hard disk or the third hard disk are modified according to the data of the first hard disk, the second hard disk and the third hard disk.

In one embodiment, the first hard disk and the second hard disk each has a plurality of sectors, and in the step of according to the data among the backup data and corresponding to the second hard disk, selectively repairing the second hard disk according to the first hard disk and the third hard disk, the backup data and the access record are compared to determine whether a data time of the data of a first sector of the plurality of sectors among the backup data and corresponding to the second hard disk corresponds to the access record, and repairing the second hard disk according to the first hard disk and the second hard disk when the data time corresponds to the access record.

In one embodiment, in the step of according to the data among the backup data and corresponding to the second hard disk, selectively repairing the second hard disk according to the first hard disk and the third hard disk, the data among the backup data and corresponding to the first sector is written into the first sector when the data time does not correspond to the access record.

In one embodiment, when the data time does not correspond to the access record, the error correction code stored in the first hard disk, the second hard disk or the third hard disk are modified according to the data of the first hard disk, the first sector and the third hard disk.

What is claimed is:

1. A reconstruction method based on a hard disk array, comprising:
   determining whether at least one damaged hard disk among a plurality of hard disks of the hard disk array has been replaced by at least one to-be-reconstructed hard disk; and
   writing a backup data corresponding to the at least one damaged hard disk into the at least one to-be-reconstructed hard disk according to a mapping table and information of the at least one damaged hard disk;
   wherein the hard disk array is capable of error correcting, the plurality of hard disks comprises a first hard disk, a second hard disk and a third hard disk, and the at least one to-be-reconstructed hard disk comprises the first hard disk and the second hard disk, wherein the writing the backup data corresponding to the at least one damaged hard disk into the at least one to-be-reconstructed hard disk comprises:
   writing a backup data corresponding to the first hard disk into the first hard disk according to the mapping table; and
   comparing a backup data corresponding to the second hard disk with an access timestamp of the first hard disk, the second hard disk and the third hard disk to selectively reconstruct the second hard disk according to data stored in the first hard disk after the backup data corresponding to the first hard disk is written therein and data stored in the third hard disk.

2. The method as claimed in claim 1, wherein the comparing the backup data corresponding to the second hard disk with the access timestamp of the first hard disk, the second hard disk and the third hard disk to selectively reconstruct the second hard disk according to data stored in the first hard disk after the backup data corresponding to the first hard disk is written therein and data stored in the third hard disk comprises:
   determining whether a data time of the backup data corresponding to the second hard disk corresponds to the access timestamp; and
   reconstructing the second hard disk according to the data stored in the first hard disk and the third hard disk when the data time corresponds to the access timestamp.

3. The method as claimed in claim 2, wherein the comparing the backup data corresponding to the second hard disk with the access timestamp of the first hard disk, the second hard disk and the third hard disk to selectively reconstruct the second hard disk according to data stored in the first hard disk after the backup data corresponding to the first hard disk is written therein and data stored in the third hard disk further comprises:
   writing the backup data corresponding to the second hard disk into the second hard disk when the data time does not correspond to the access timestamp.

4. The method as claimed in claim 2, further comprising, when the data time does not correspond to the access timestamp:
   modifying an error correction code stored in the first hard disk, the second hard disk or the third hard disk according to data of the first hard disk, the second hard disk and the third hard disk.

5. The method as claimed in claim 2, wherein the data time of the backup data corresponding to the second hard disk is a backup time of the backup data corresponding to the second hard disk.

6. The method as claimed in claim 1, wherein the first hard disk and the second hard disk have a plurality of sectors, and the comparing the backup data corresponding to the second hard disk with the access timestamp of the first hard disk, the second hard disk and the third hard disk to selectively reconstruct the second hard disk according to data stored in the first hard disk after the backup data corresponding to the first hard disk is written therein and data stored in the third hard disk comprises:
   determining whether a data time of a backup data corresponding to a first sector of the plurality of sectors of the second hard disk corresponds to the access timestamp; and
   reconstructing the first sector of the second hard disk according to the data stored in the first hard disk and the third hard disk when the data time corresponds to the access timestamp.

7. The method as claimed in claim 6, wherein the comparing the backup data corresponding to the second hard disk with the access timestamp of the first hard disk, the second hard disk and the third hard disk to selectively reconstruct the second hard disk according to data stored in the first hard disk after the backup data corresponding to the first hard disk is written therein and data stored in the third hard disk further comprises:
   writing the backup data corresponding to the first sector of the backup data into the first sector when the data time does not correspond to the access timestamp.

8. The method as claimed in claim 6, further comprising, when the data time does not correspond to the access timestamp:
   modifying an error correction code stored in the first hard disk, the second hard disk or the third hard disk according to data of the first hard disk, a first sector and the third hard disk.

9. The method as claimed in claim 6, wherein the data time of the backup data corresponding to the first sector of the plurality of sectors of the second hard disk is a backup time of the backup data corresponding to the first sector of the plurality of sectors of the second hard disk.

10. A hard disk array, comprising:
a first hard disk;
a second hard disk;
a third hard disk; and
a controller, electrically connected with the first hard disk, the second hard disk and the third hard disk, and configured to determine whether at least one damaged hard disk among the first hard disk, the second hard disk and the third hard disk has been replaced by at least one to-be-reconstructed hard disk, and to write a backup data corresponding to the at least one damaged hard disk into the at least one to-be-reconstructed hard disk according to a mapping table;
wherein the at least one to-be-reconstructed hard disk comprises the first hard disk and the second hard disk, the controller writes a backup data corresponding to the first hard disk into the first hard disk according to the mapping table, and the controller further compares a backup data corresponding to the second hard disk with an access timestamp of the first hard disk, the second hard disk and the third hard disk to selectively reconstruct the second hard disk according to data stored in the first hard disk after the backup data corresponding to the first hard disk is written therein and data stored in the third hard disk.

11. The hard disk array as claimed in claim 10, wherein the controller further determines whether a data time of the backup data corresponding to the second hard disk corresponds to the access timestamp, and reconstructs the second hard disk according to the data stored in the first hard disk after the backup data corresponding to the first hard disk is written therein and the data in the third hard disk when the data time corresponds to the access timestamp.

12. The hard disk array as claimed in claim 11, wherein the controller writes the backup data corresponding to the second hard disk into the second hard disk when the data time does not correspond to the access timestamp.

13. The hard disk array as claimed in claim 11, wherein the data time of the backup data corresponding to the second hard disk is a backup time of the backup data corresponding to the second hard disk.

14. The hard disk array as claimed in claim 11, wherein the controller modifies an error correction code stored in the first hard disk, the second hard disk or the third hard disk according to data of the first hard disk, the second hard disk and the third hard disk.

15. The hard disk array as claimed in claim 10, wherein the controller determines whether a data time of a backup data corresponding to a first sector of a plurality of sectors of the second hard disk corresponds to the access timestamp, and reconstructs the first sector of the second hard disk according to the data stored in the first hard disk and the third hard disk when the data time corresponds to the access timestamp.

16. The hard disk array as claimed in claim 15, wherein the controller writes the backup data corresponding to the first sector into the first sector when the data time does not correspond to the access timestamp.

17. The hard disk array as claimed in claim 15, wherein the data time of the backup data corresponding to the first sector of the plurality of sectors of the second hard disk is a backup time of the backup data corresponding to the first sector of the plurality of sectors of the second hard disk.

18. The hard disk array as claimed in claim 15, wherein the controller modifies an error correction code stored in the first hard disk, the second hard disk or the third hard disk according to data of the first hard disk, a first sector and the third hard disk.

* * * * *